(12) United States Patent
Carter et al.

(10) Patent No.: US 12,239,104 B1
(45) Date of Patent: Mar. 4, 2025

(54) DOG WALKING OR JOGGING APPARATUS AND METHOD

(71) Applicants: Jeffrey L. Carter, Buda, TX (US);
Patricia S. Carter, Buda, TX (US);
Lacey J. Carter, Buda, TX (US)

(72) Inventors: Jeffrey L. Carter, Buda, TX (US);
Patricia S. Carter, Buda, TX (US);
Lacey J. Carter, Buda, TX (US)

(*) Notice: Subject to any disclaimer, the term of this patent is extended or adjusted under 35 U.S.C. 154(b) by 32 days.

(21) Appl. No.: 17/153,052

(22) Filed: Jan. 20, 2021

(51) Int. Cl.
*A01K 27/00* (2006.01)

(52) U.S. Cl.
CPC .......... *A01K 27/003* (2013.01); *A01K 27/005* (2013.01); *A01K 27/006* (2013.01)

(58) Field of Classification Search
CPC .. A01K 27/003; A01K 27/005; A01K 27/006; A01K 1/04; B62J 11/20
See application file for complete search history.

(56) References Cited

U.S. PATENT DOCUMENTS

| | | | | |
|---|---|---|---|---|
| 4,134,364 A * | 1/1979 | Boncela | ................... | B62J 11/20 280/288.4 |
| 4,541,364 A * | 9/1985 | Contello | .............. | A01K 27/005 119/772 |
| 4,854,269 A * | 8/1989 | Arntzen | ................... | A01K 1/04 119/703 |
| 5,033,409 A * | 7/1991 | Sabot | ................... | A01K 27/003 280/288.4 |
| 5,103,771 A * | 4/1992 | Lee | ....................... | A01K 27/005 119/776 |
| 5,775,970 A * | 7/1998 | Klees | ........................ | A63H 3/50 472/64 |
| 5,842,445 A * | 12/1998 | Barbour | ................... | A01K 1/04 119/771 |
| 6,006,699 A * | 12/1999 | Keever | ................ | A01K 27/005 119/795 |
| 6,053,129 A * | 4/2000 | Akre | ..................... | A01K 27/005 119/799 |
| 6,247,428 B1 * | 6/2001 | Mireles | ................ | A01K 27/003 119/771 |
| 6,557,498 B1 * | 5/2003 | Smierciak | ............ | A01K 27/006 119/858 |
| 2005/0022752 A1 * | 2/2005 | Leon | ........................ | A01K 1/04 119/771 |
| 2007/0101950 A1 * | 5/2007 | Medlin | ................ | A01K 27/005 119/792 |
| 2007/0119385 A1 * | 5/2007 | Slank | .................... | A01K 27/005 119/776 |

(Continued)

*Primary Examiner* — Magdalena Topolski
*Assistant Examiner* — Edgar Reyes
(74) *Attorney, Agent, or Firm* — Rick B. Yeager

(57) ABSTRACT

A dog walking device to maintain a lateral offset between a dog and a walker or jogger. This lateral offset facilitates unimpeded forward movement of the walker or jogger by minimizing the dog's side to side movements which can disrupt the walker's or jogger's stride. In one example, the device has a proximal frame portion with a hand grip; a distal frame portion with a dog collar, or harness connection with a rotatable joint; and a rigid or semi-rigid intermediate frame section between the proximal frame portion and the distal frame portion. The intermediate frame section uses U-shape and inverted U-shape portions, or a coil spring to provide the horizontal offset. Vertical offset can be adjusted with a telescoping joint.

16 Claims, 24 Drawing Sheets

(56) References Cited

U.S. PATENT DOCUMENTS

| | | | | |
|---|---|---|---|---|
| 2010/0018474 | A1* | 1/2010 | Noonan | A01K 27/004 24/713.6 |
| 2010/0319631 | A1* | 12/2010 | Rane | A01K 27/003 119/799 |
| 2011/0232031 | A1* | 9/2011 | Salais | F41H 9/10 16/111.1 |
| 2014/0076244 | A1* | 3/2014 | Byrne | A01K 27/003 119/799 |
| 2014/0283759 | A1* | 9/2014 | Bianchi | A01K 27/005 119/771 |
| 2015/0033542 | A1* | 2/2015 | Miron | A01K 27/005 29/515 |
| 2015/0327515 | A1* | 11/2015 | Blough | A01K 29/00 119/702 |
| 2016/0249589 | A1* | 9/2016 | Soto | A01K 27/004 119/794 |
| 2017/0006833 | A1* | 1/2017 | Brogan | A01K 15/02 |
| 2019/0061860 | A1* | 2/2019 | Greiner | B62J 11/20 |
| 2020/0359604 | A1* | 11/2020 | Soto | A01K 27/001 |
| 2021/0059218 | A1* | 3/2021 | Benning | A01K 27/005 |

\* cited by examiner

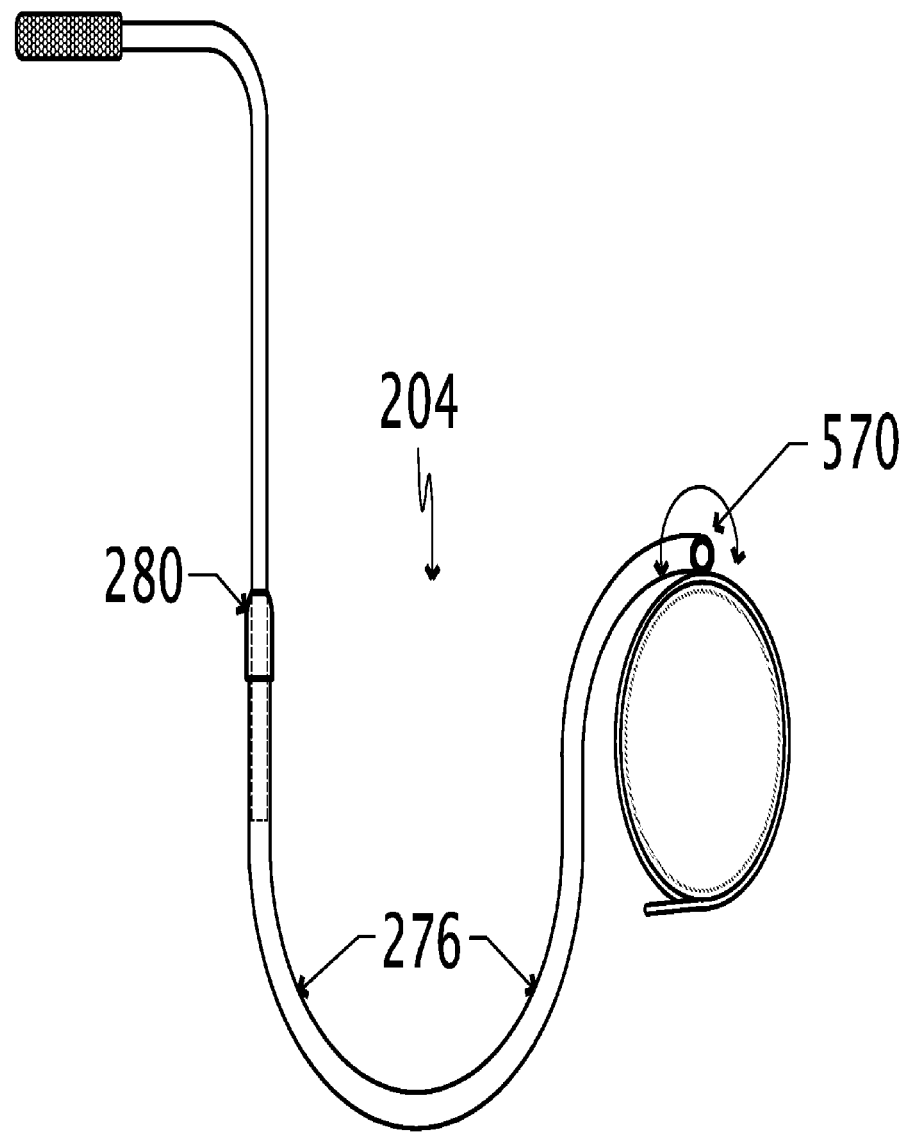

DOG WALKING OR JOGGING APPARATUS AND METHOD

BACKGROUND-FIELD OF INVENTION

The current invention relates to an apparatus and method for maintaining a separation distance while walking or jogging with a dog.

BACKGROUND-PRIOR ART

When a human is walking or jogging with a dog with a short leash, there is a risk that the dog can inadvertently trip the human, such as by abruptly cutting in front of the person.

The prior art discloses two methods to reduce this risk.

The first method is to us a rigid shaft, where one end of the shaft is held by the person, and the other end of the shaft is directly attached to the dog's collar or harness. Variations of this shaft method include providing a short length of chain or leash between the distal end of the shaft and the collar or leash; and routing a chain or leash through a hollow shaft.

A second method is to provide a much longer leash or lead. If the dog remains well ahead of the walker or jogger, this provides more reaction time for the person to avoid a collision. Disadvantages of this technique include reduced control over the dog, such as when other persons are animals are encountered, and increased risk of entanglement with trees, shrubs, poles, etc. along the route.

SUMMARY OF INVENTION

Various assemblies are described for maintaining a lateral offset, typically in the range of 12-48 inches, between a dog and a walker or jogger.

In one embodiment, a dog walking device comprises a frame with a single vertically oriented U shaped frame section. One end of the frame is attached to a dog collar or harness, and the other end of the frame is configured to be held by one or both hands while walking or jogging with the dog. The frame sections drop below the dog's neck so that the outermost frame section serves to provide a guide for the dog to maintain a lateral separation from the person. The frame may rotate with respect to the hand grip and/or the collar or harness.

In one embodiment, a dog walking device comprises a frame with plurality of vertically oriented U-shaped and inverted U-shaped frame sections.

In some examples the height of the frame may be adjusted, such as with a telescoping or spring pin connection. In one example, the frame comprises a single inverted U-shaped section with a U-shaped section tp each side. In other examples, the lateral spacing of the frame may be in creased by providing one or more additional inverted U-shaped sections and U-shaped sections. In some examples, a breakaway joint is provided near the collar or harness, and a safety cable may be routed through the frame. In some examples, the frame may be attached to a waist belt.

In another embodiment, a dog walking device comprises a frame with a single vertically oriented loop spacer frame section.

In another embodiment, a dog walking device comprises a frame with a coiled spring frame section.

In another embodiment, a dog walking device comprises a frame with plurality of horizontally oriented U-shaped and inverted U-shaped frame sections. One end of the frame is attached to a dog collar or harness, and the other end of the frame is configured to be held by one or both hands while walking or jogging with the dog. The frame may rotate with respect to the hand grip and/or the collar or harness.

In another embodiment, a dog walking device comprises a tubular frame with an upper bend in proximity to a hand grip, and a lower bend in proximity to a harness. The frame may rotate with respect to the hand grip and the harness.

In another embodiment, a dog walking device comprises a tubular frame trapezoidal frame with an upper rotational joint near a hand grip, and a lower rotational joint in proximity to the harness. harness. The frame may rotate with respect to the hand grip and the harness.

BRIEF DESCRIPTION OF THE DRAWINGS

FIG. 19B is a side view of the dog walking device of FIG. 19A.

DETAILED DESCRIPTION

Figure 1:
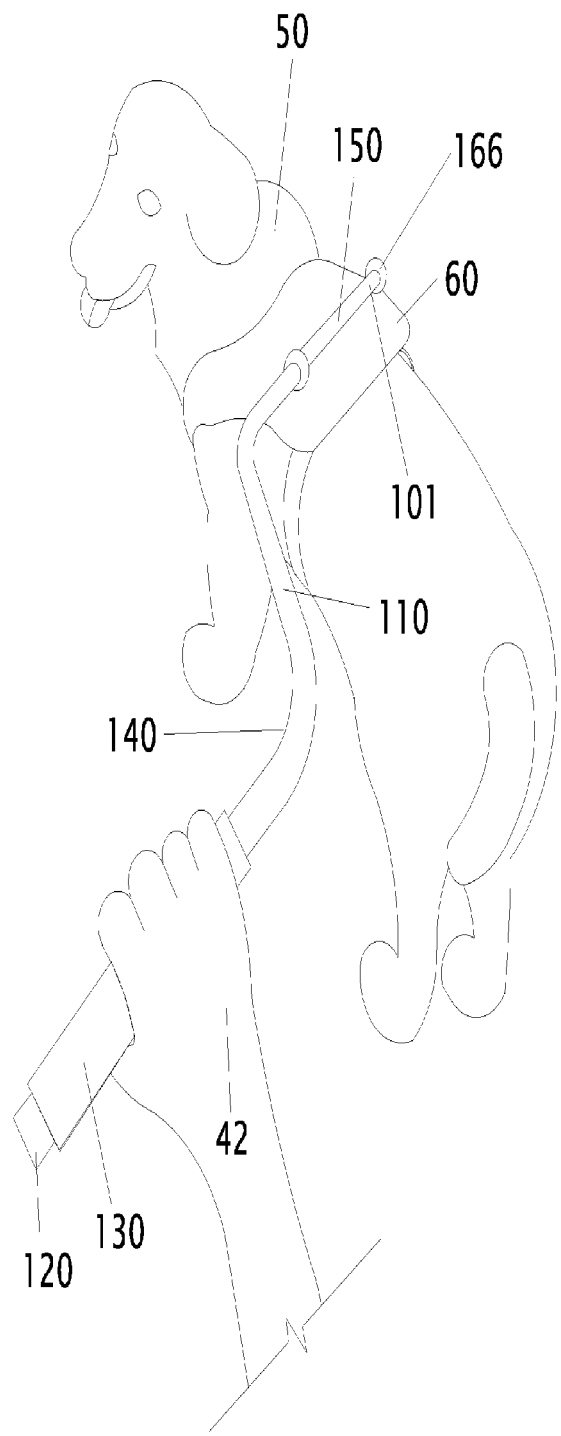
FIG. 1 is a top perspective view of an embodiment of a dog walking device.

In this specification, the term "dog walker" means a person who is walking or jogging with a dog.

In this specification, the term "dog walking device" means a frame having a proximal portion configured to be gripped by or attached to a dog walker; a distal portion configured to be attach able to a dog such as to a collar or harness; and a plurality of bends or joints between the proximal portion and the distal portion. The dog walking device may include various features such as one or more rotation joint, a breakaway joint, an adjustable telescoping frame segments, a safety cable or rope, or LED lighting.

In this specification, the term "vertical offset" means the approximate vertical height difference between the top of a dog's collar of harness and the hand or hands that holds the dog walking device.

In this specification, the term "horizontal offset" means the approximate minimum horizontal length difference between the top of a dog's collar of harness and the hand or hands that holds the dog walking device. For example, if both hands hold an elongated handle, then the horizontal offset is the horizontal length difference between the hand closest to the dog and the top of a dog's collar of harness.

In this specification, the term "rigid" means a dog walking device structural element with sufficient modulus to resist bending by forces exerted on the device by a dog. If a frame element is "rigid", then other frame elements will bend before that element, or the dog walker's hand will be forced to move before that element is bent.

In this specification, the term "semi-rigid" means a dog walking device structural element with sufficient modulus and elasticity to bend slightly in response to a force, and return to its normal orientation when the force is removed. For example, in some embodiments described below, the arms of multiple U-shaped or inverted U-shaped polymer sections may bend slightly inward or outward in response to forces exerted by the dog or dog walker, and then return to a normal orientation when that force is removed.

The following elements are listed for convenience in reviewing FIGS. 1-20B.

human 40
hand 42
dog 50
head 51
shoulder height b2
harness 60
collar 70
dog walking device 101
frame 110
proximal end portion 120
rotatable grip handle 130
combination handle 132
vertical grip 133
horizontal grip 134
elongated handle 136
intermediate frame portion 140
upper bend 142
lower bend 144
distal end portion 150
harness connection 160
longitudinal harness connection 161
left side harness bracket 162
right side harness bracket 166
dog walking device 201, 202, 203, 204, 205
frame 210
proximal end portion 220
rotatable grip 230
combination handle 232
vertical grip 233
horizontal grip 234
non-telescoping rotational joint 320
intermediate frame portion 240
proximal U portion 270
vertical section 241
telescoping joint connector 280, 281
upper section 241a
lower section 241b
bend section 242
vertical section 243
inverted U portion 272
vertical section 243
bend section 244
vertical section 245
distal U portion 274
vertical section 245
bend section 246
vertical section 247
universal ball joint 290
single U portion 276
spring coil portion 280
LED light 279
distal end portion 250
breakaway coupler 254
frame section 255
collar connection section 256
nipple 257
collar connection 260
safety cable 300
wrist strap 302
connector 304
belt assembly 310
belt 312
buckle 313
rotational joint 314
bearings 315
extension 316
connector 317
dog walking device 401
frame 410
proximal end portion 420
grip 430
rotational joint 422
intermediate frame section 440
trapezoidal frame 600
distal end portion 450
harness connection 460
rotational joints 462
dog walking device 501
frame 510
proximal end portion 520
rotational joint 522

| |
|---|
| intermediate frame portion 540 |
| distal end portion 550 |
| longitudinal harness connection 560 |
| tubing with bearing rollers 562 |
| rotational joint 570 |

Example—Dog Walking Device

FIG. 1 is a top perspective view of an embodiment of a dog walking device 101. In this example, the dog walking device has a frame 110 with proximal end portion 120, a distal end portion 150, and an intermediate frame portion 140. A rotatable grip 130 is provided on the frame proximal end portion 120. In this example, a harness connection 160 is provided on the distal end portion 150. In this example, the harness connection 160 is transverse with respect to the dog 50, and includes left side harness bracket 162 and a right side harness bracket 166. The distal end portion 150 of frame 110 can rotate with respect to the right and left side harness brackets. In other examples, the dog walking device may be attached to a collar or harness in a different orientation. In another example, for instance, the harness connection may be longitudinal with respect to the dog.

In this example, the frame is constructed of a rigid metal tube. The rotatable grip 130 permits the intermediate frame portion 140 to pivot with respect to the grip so that the distal end portion can be maintained in position above the dog's shoulders and with a constant lateral distance between the dog and the hand 42. This orientation permits the human to maintain a comfortable hand position while walking or jogging. The hand is not forced into a "handshake" orientation as with prior art straight bar-type devices.

Figure 2A:
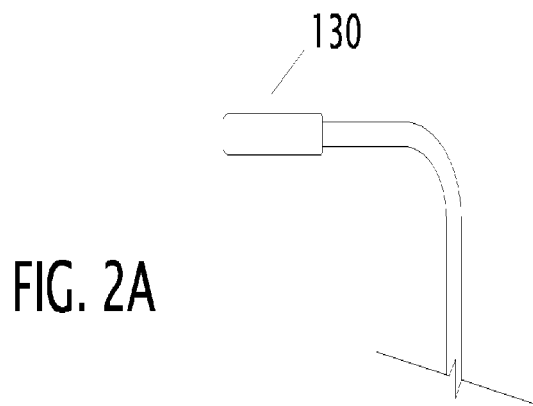
FIG. 2A is a front view of a rotating hand-grip.
Figure 2B:
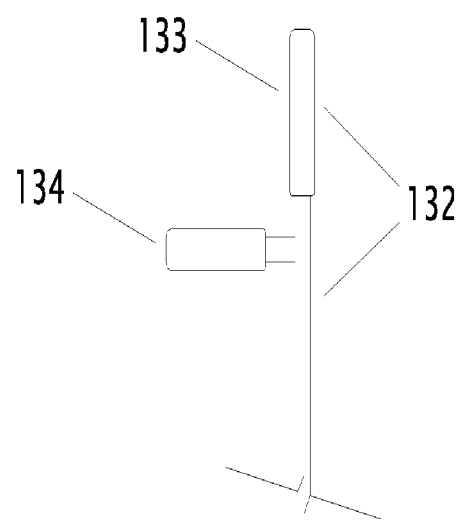
FIG. 2B is a front view of a combination handle with both vertical and horizontal hand grips.
Figure 2C:
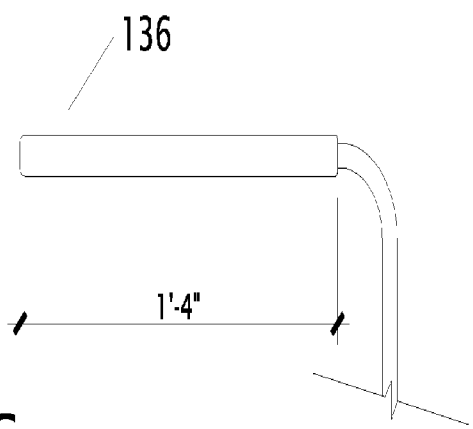
FIG. 2C is a front view of an elongated handle configured to be gripped by two hands.

Various types of grips may be used for this and other embodiments of dog walking devices. FIG. 2A is a front view of a rotating hand-grip 130. In this example, the hand-grip is provided on rotating bearings (not shown). FIG. 2B is a front view of a combination handle 132 with both a vertical grip 133 and a horizontal grip 134. FIG. 2C is a front view of an elongated handle 136 configured to be gripped by two hands. In one example, an elongated handle has a grip portion that is about 16 inches long.

Example—Dog Walking Device

Figure 3:
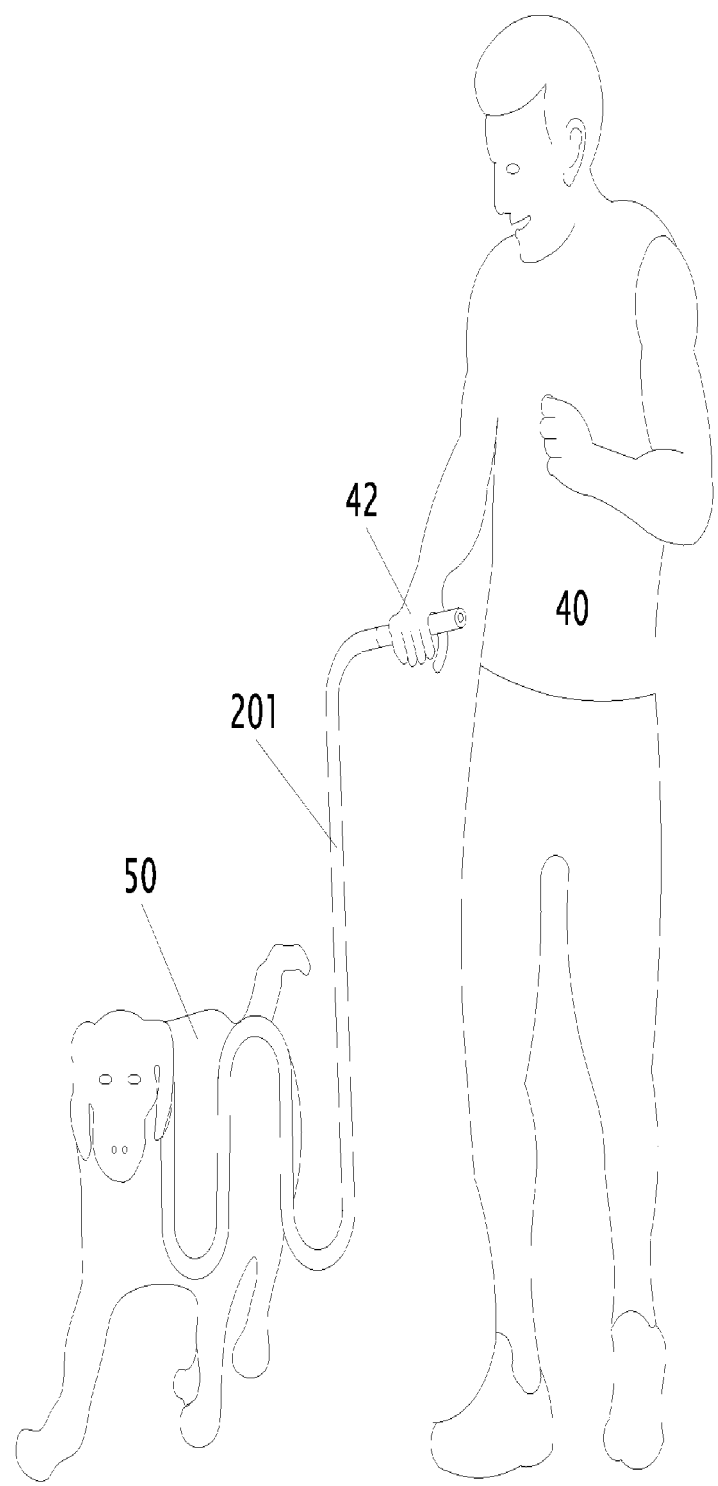
FIG. 3 is a front perspective view of a human walker or jogger with a second embodiment of a dog walking device.

FIG. 3 is a front perspective view of a human walker or jogger 40, a second embodiment of a dog walking device 201 attached to the collar a dog 50. In this example, the frame 210 has a proximal end portion 220 with a rotatable grip 230 and a distal end portion 250 with a collar connection 260.

Figure 4:
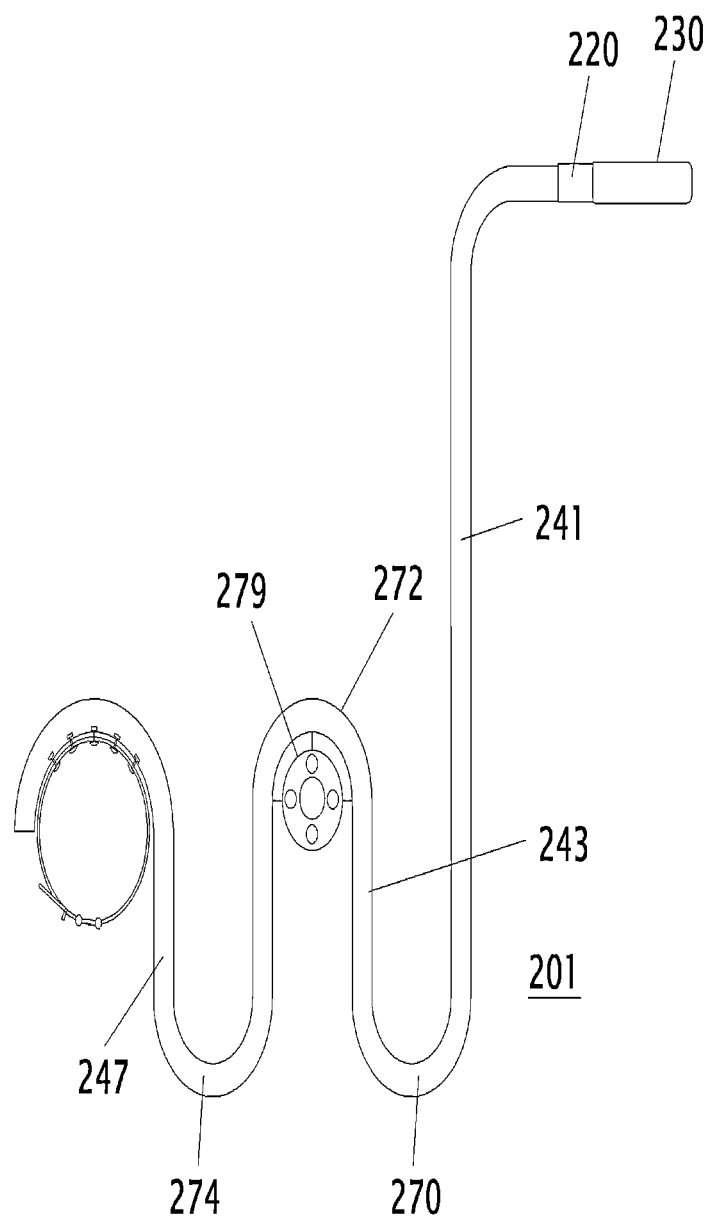
FIG. 4 is a front view of the dog walking device of FIG. 3.

FIG. 4 is a front view of dog walking device 201. In this example, the intermediate frame portion 240 comprises three U-shaped sections. Proximal U-portion 270 has a vertical section 241, a bend section 242, and a vertical section 243. Inverted U-portion 272 has vertical section 243, a bend section 244, and vertical section 245. Distal U-portion 274 has vertical section 245, a bend section 246, and a vertical section 247. In one example the U-portion and inverted U-portion are provided as semi-rigid polymer tubing. The frame may include one or more lights 279, such as LED lights.

In this example, vertical sections 243, 245, and 247 have approximately the same length, and are shorter than vertical section 241. In other examples, vertical sections 243 and 245 may have a length that is between the length of section 241 and 247.

Figure 5:
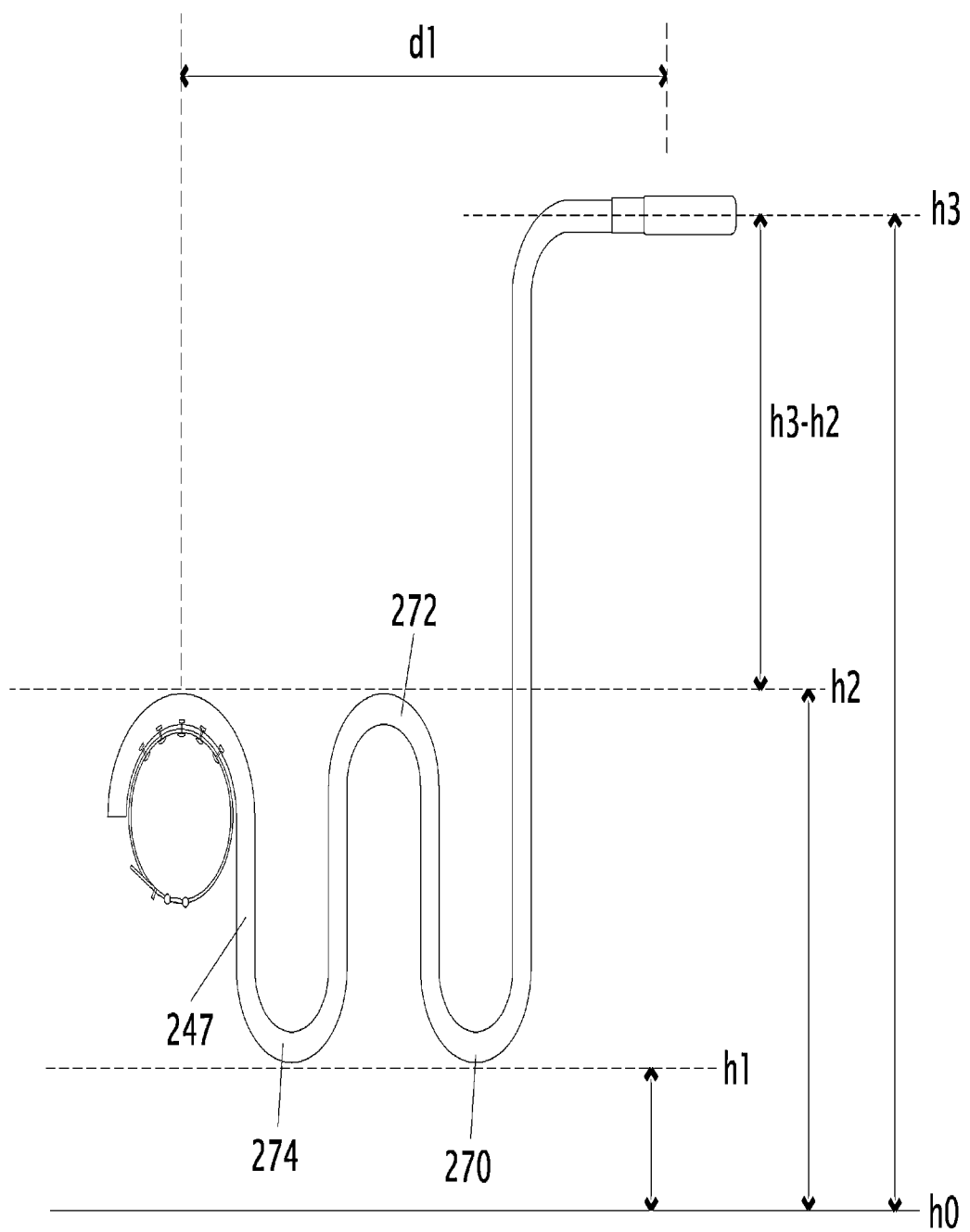
FIG. 5 is a front view of the dog walking device of FIG. 3 showing example heights relative to ground level.

FIG. 5 is a front view of dog walking device 201 showing example heights relative to ground level h0. In this example, the dog neck or top of collar height is shown by h2. The U-shaped sections create and maintain a separation distance d1 between the dog and the hand. In this ex ample, distal U-portion 274 drops to a distance h1 well below the dog shoulder but above ground level h0. Vertical section 274 provides a slight pressure against the dog to maintain a separation distance, and to encourage continued forward alignment versus turning in front of the human. The use of multiple sections that drop below the dog's shoulders reinforces the frame, so that the frame may be constructed of a lightweight material, such as a polymer.

Figure 6A:
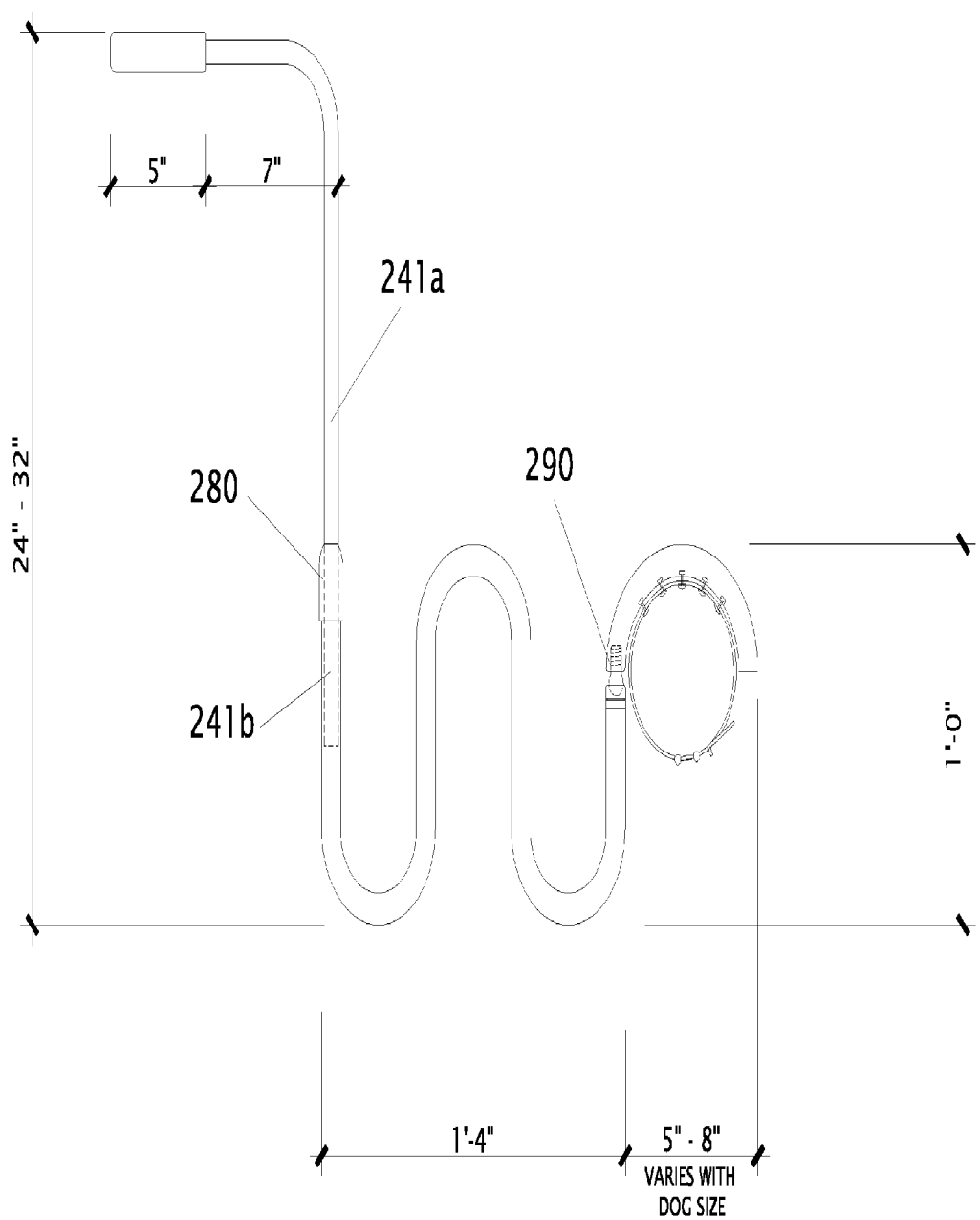
FIG. 6A is a rear view of the dog walking device of FIG. 3 showing a telescopic joint to adjust height, and a ball joint to permit collar movement relative to the dog walking device.
Figure 6B:
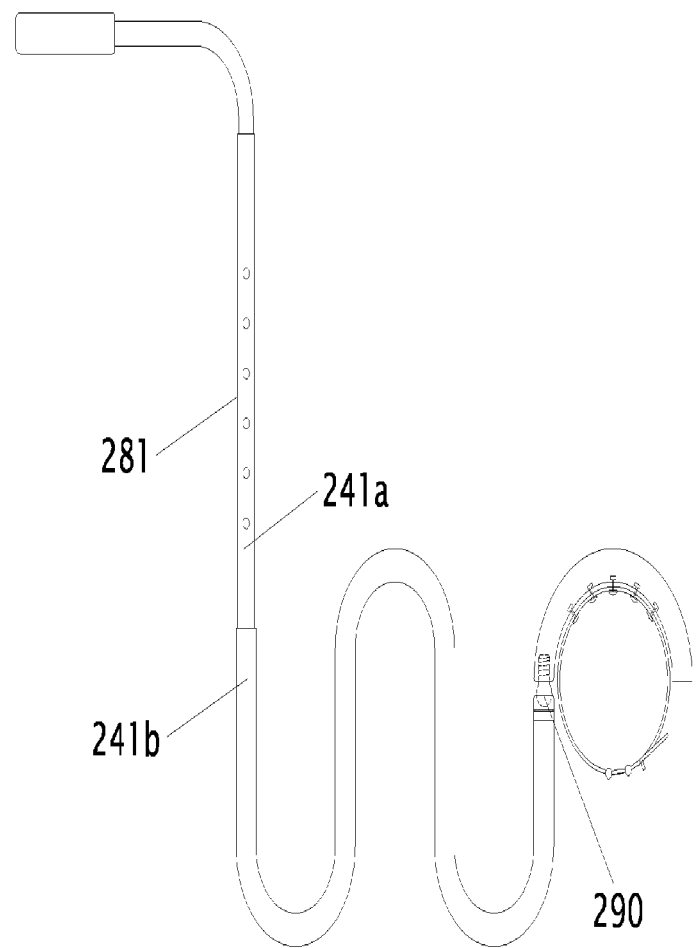
FIG. 6B is a rear view of the dog walking device of FIG. 3 showing a telescopic joint with spring pins.

Device size may be selected based on dog height, and minor height adjustment can be compensated by permitting the device to pivot slightly from vertical, such as by rotation at the hand grip. FIG. 6A is a rear view of the dog walking device of FIG. 3 showing a telescopic joint connector 280 to adjust height. In this example, an upper portion 241a of vertical section 241 is constructed of a ½" outer diameter polymer tubing that can slide in or out relative to a lower portion 241b which is constructed of a ¾" outer diameter polymer tubing. A comfortable hand height can then be set by tightening telescopic joint connector 280. FIG. 6A also shows a universal ball joint 290 near the distal end portion 250 to permit collar connection 260 movement relative to the dog walking device frame. FIG. 6B is a rear view of the dog walking device of FIG. 3 showing a telescopic joint 281 with spring pins.

Figure 7:
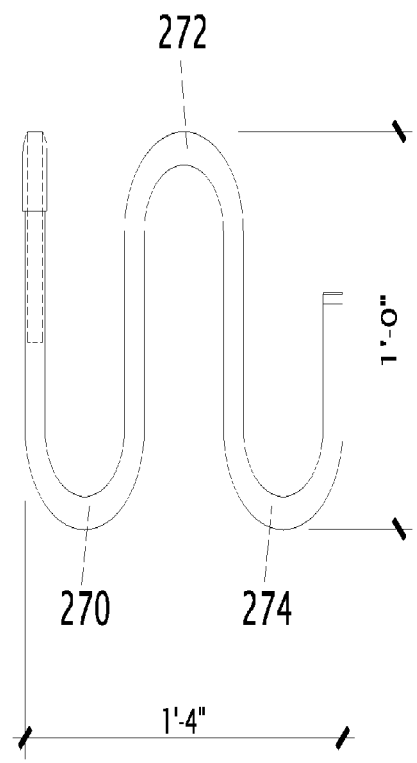
FIG. 7 is a rear view of a portion of the frame of the dog walking device of FIG. 6.

The separation distance can be increased by providing additional U-portions. FIG. 7 is a rear view of a portion of the frame of the dog walking device of FIG. 6 showing a standard size spacer configured for most medium or large dogs. In this example, the three U-portions 270, 272, and 274 each have an internal radius of about 2" to provide total horizontal length of about 16 inches. U-portion 272 has a height of about 12 inches.

Figure 8:
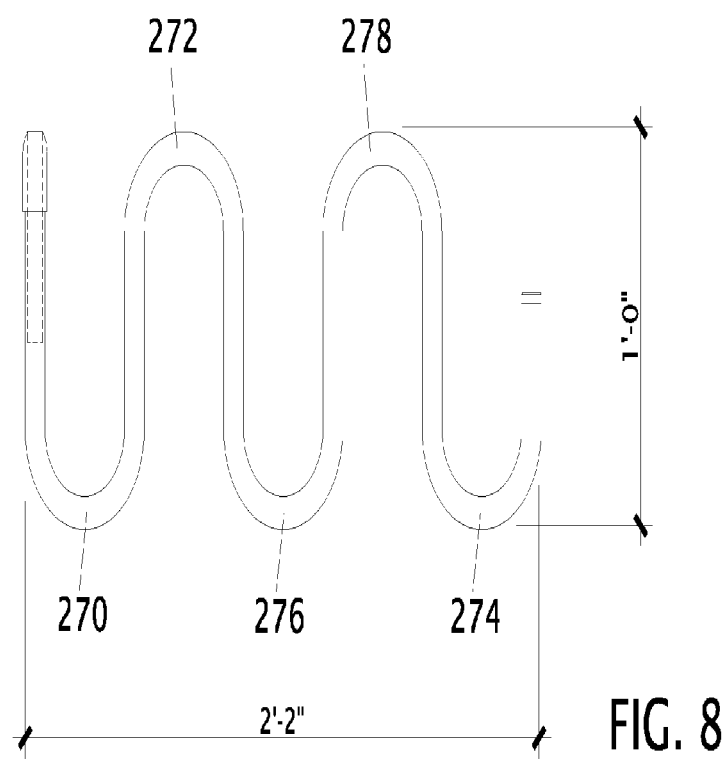
FIG. 8 is a rear view of a portion of the frame of the dog walking device of FIG. 6 showing additional U-portions to provide additional spacing for larger dogs.

FIG. 8 is a rear view of a portion of the frame of the dog walking device of FIG. 6 showing additional U portions 276 and 278 to provide additional horizontal spacing for larger dogs. In this example, the five U-portions 270, 272, 274, 276, and 278 each have an internal radius of about 2" to provide total horizontal length of about 26 inches. In this example, U-portions 272, 276, and 278 each have the same height of about 12 inches. In other examples, the U-portions may have different heights.

Figure 9C:
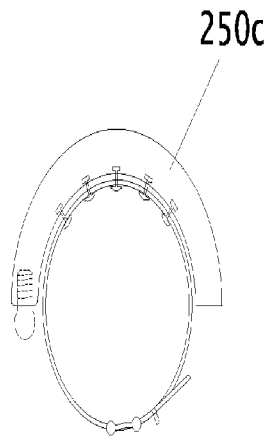
FIG. 9C is a front view of the distal portion of the dog walking device of FIG. 3 configured for the collar of large size dogs.
Figure 9B:
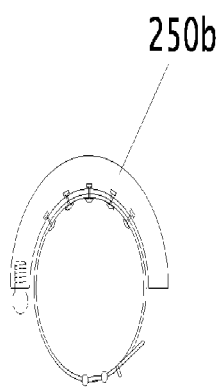
FIG. 9B is a front view of the distal portion of the dog walking device of FIG. 3 configured for the collar of medium to large size dogs.
Figure 9A:
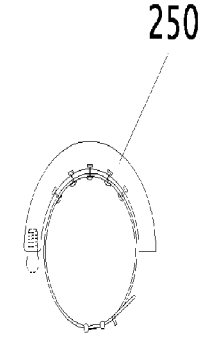
FIG. 9A is a front view of the distal portion of the dog walking device of FIG. 3 configured for the collar of medium size dogs.

The distal end portion 250 may be configured for various size collars. FIG. 9A is a front view of the distal portion 250a of the dog walking device of FIG. 3 configured for the collar of medium size dogs with 11 to 15 inch necks. FIG. 9B is a front view of the distal portion 250b of the dog walking device of FIG. 3 configured for the collar of medium to large size dogs with 16 to 19 inch necks. FIG. 9C is a front view of the distal portion 250c of the dog walking device of FIG. 3 configured for the collar of large size dogs with 20-25 inch necks.

In other examples, a distal end portion may be configured to attach to a harness, such as shown in FIG. 1.

Figure 18:
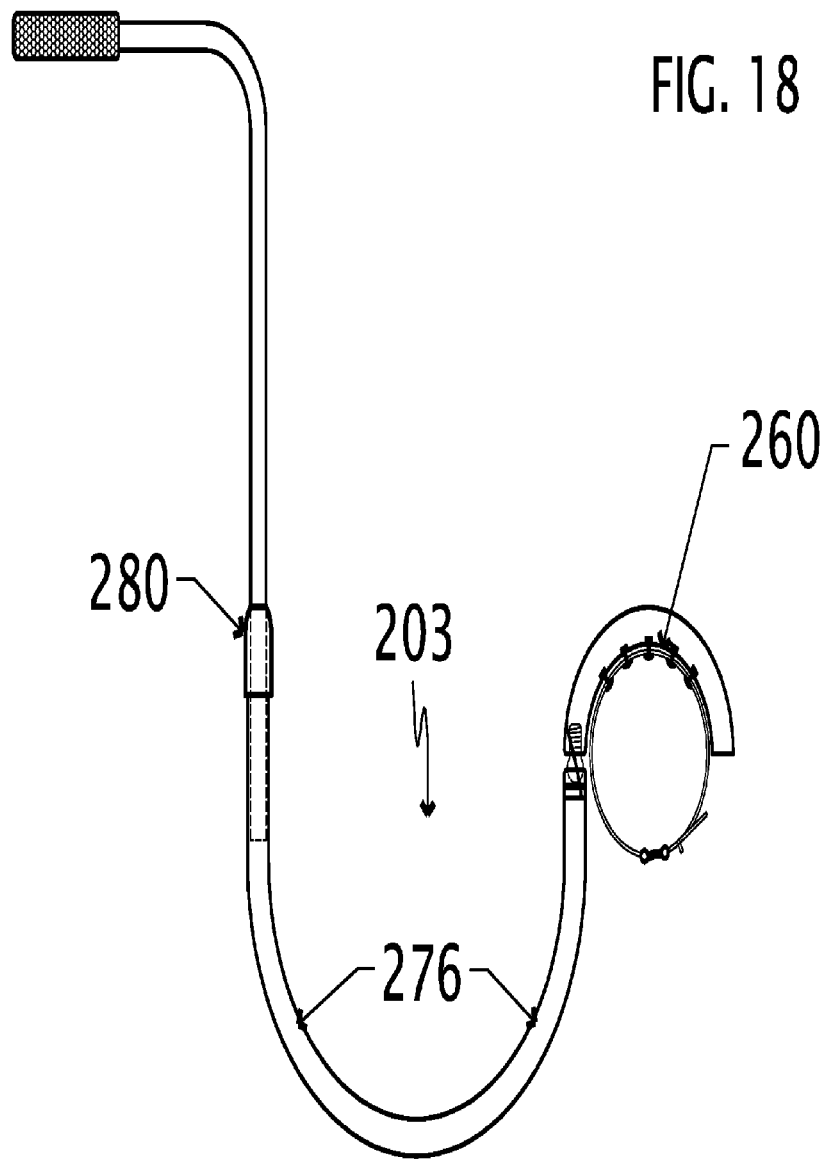
FIG. 18 is a side view of a dog walking device with a single vertically oriented U-shaped inter mediate frame section and a collar connection.

FIG. 18 is a side view of a dog walking device 203 comprising a single vertically oriented U shaped intermediate frame section 276 with a collar connection 260. In one example, the inter mediate frame section 276 has an internal radius of 7 inches. The radius may be smaller or larger to fit various sizes of dogs.

Figure 19A:
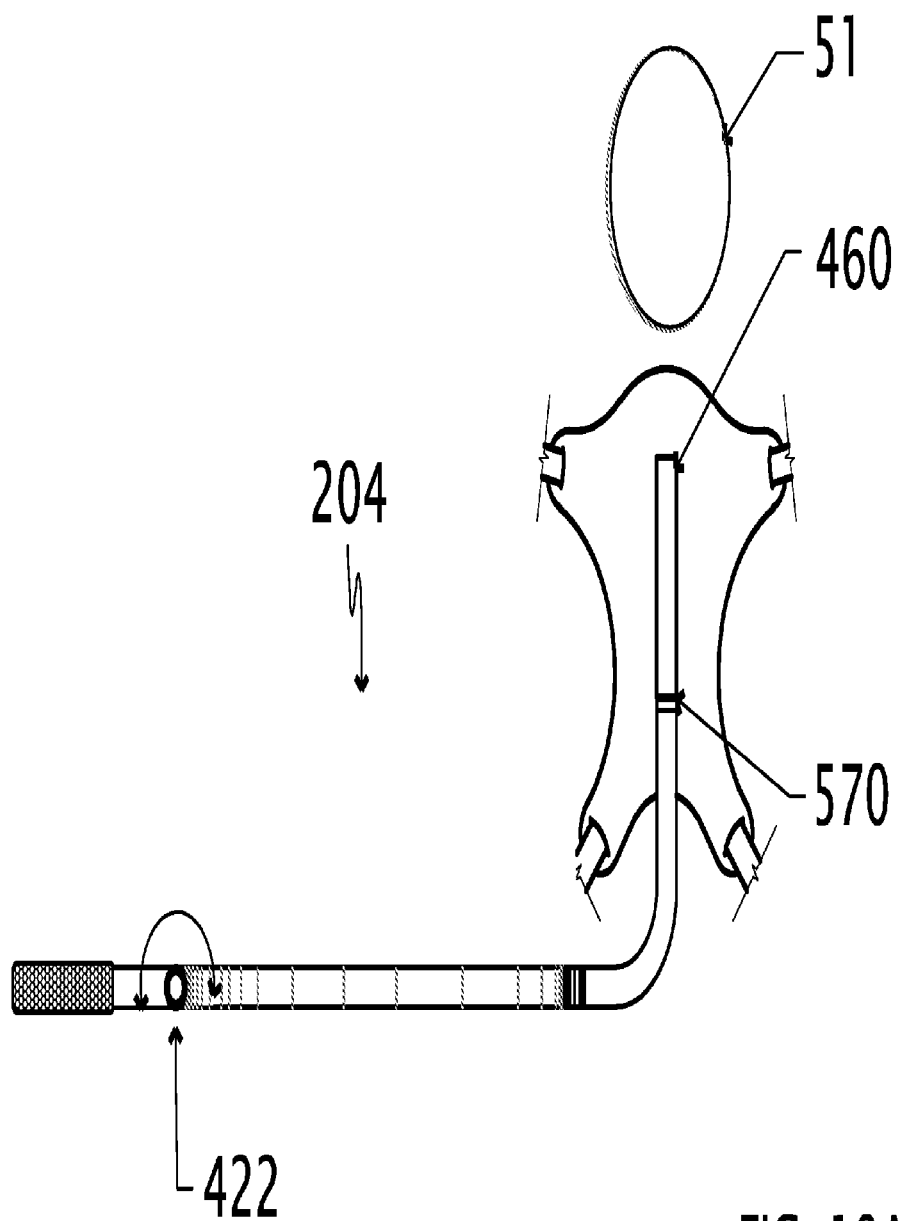
FIG. 19A is a top view of a dog walking device with a single vertically oriented U-shaped inter mediate frame section and a harness connection.

FIG. 19A is a top view of a dog walking device 204 with a single vertically oriented U-shaped intermediate frame section and a harness connection 460. FIG. 19B is a side view of the dog walking device 204 of FIG. 19A.

Figure 20A:
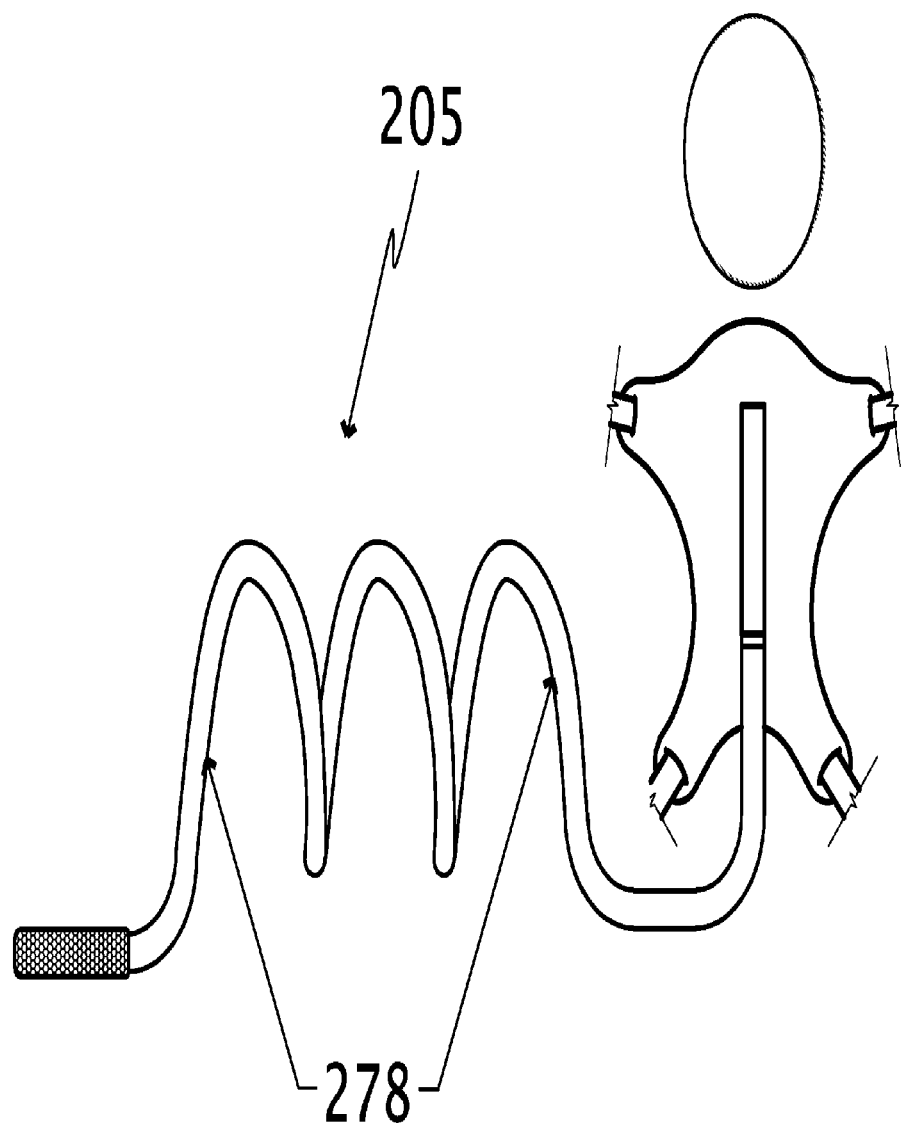
FIG. 20A is a top view of a dog walking device with a spring coil intermediate frame section and a harness connection.
Figure 20B:
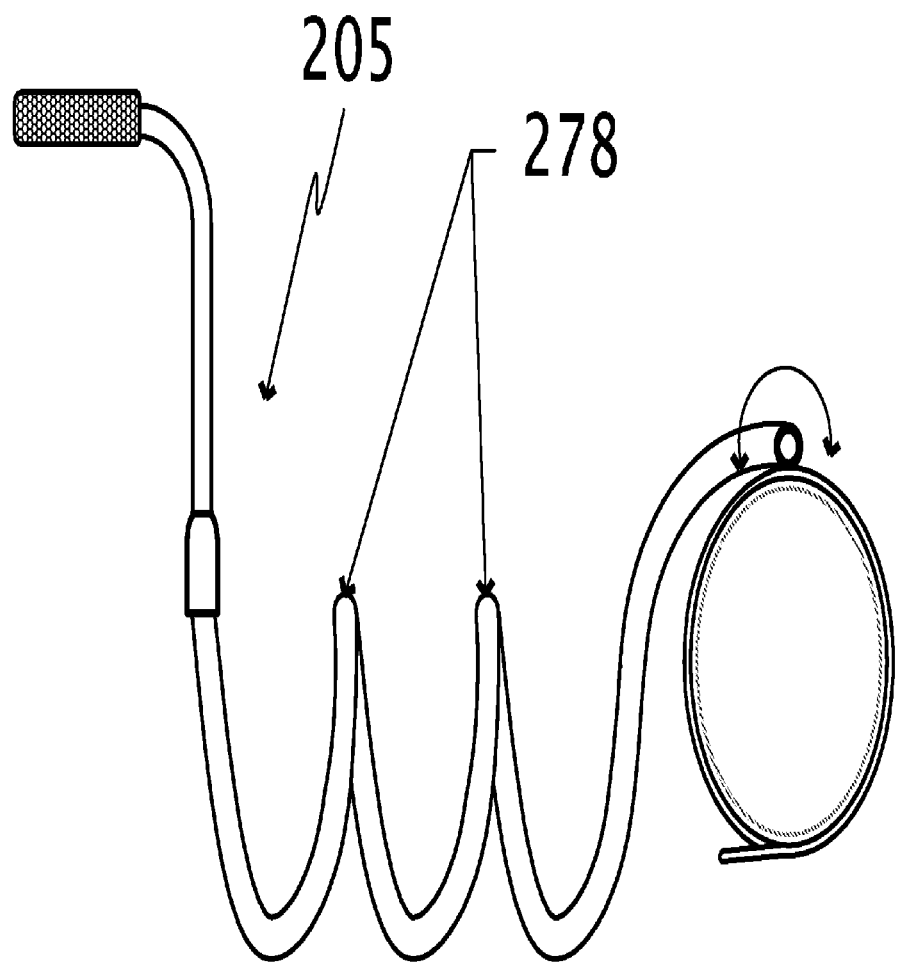
FIG. 20B is a side view of the dog walking device of FIG. 20A.

FIG. 20A is a top view of a dog walking device 205 with a spring coil intermediate frame section 278 and a harness connection. FIG. 20B is a side view of the dog walking device 205 of FIG. 20A. In this example, the spring coil can contract or expand in a vertical or horizontal direction.

Example—Break-Away Collar Section and Safety Cable

Figures 10A, 10B, 10C:
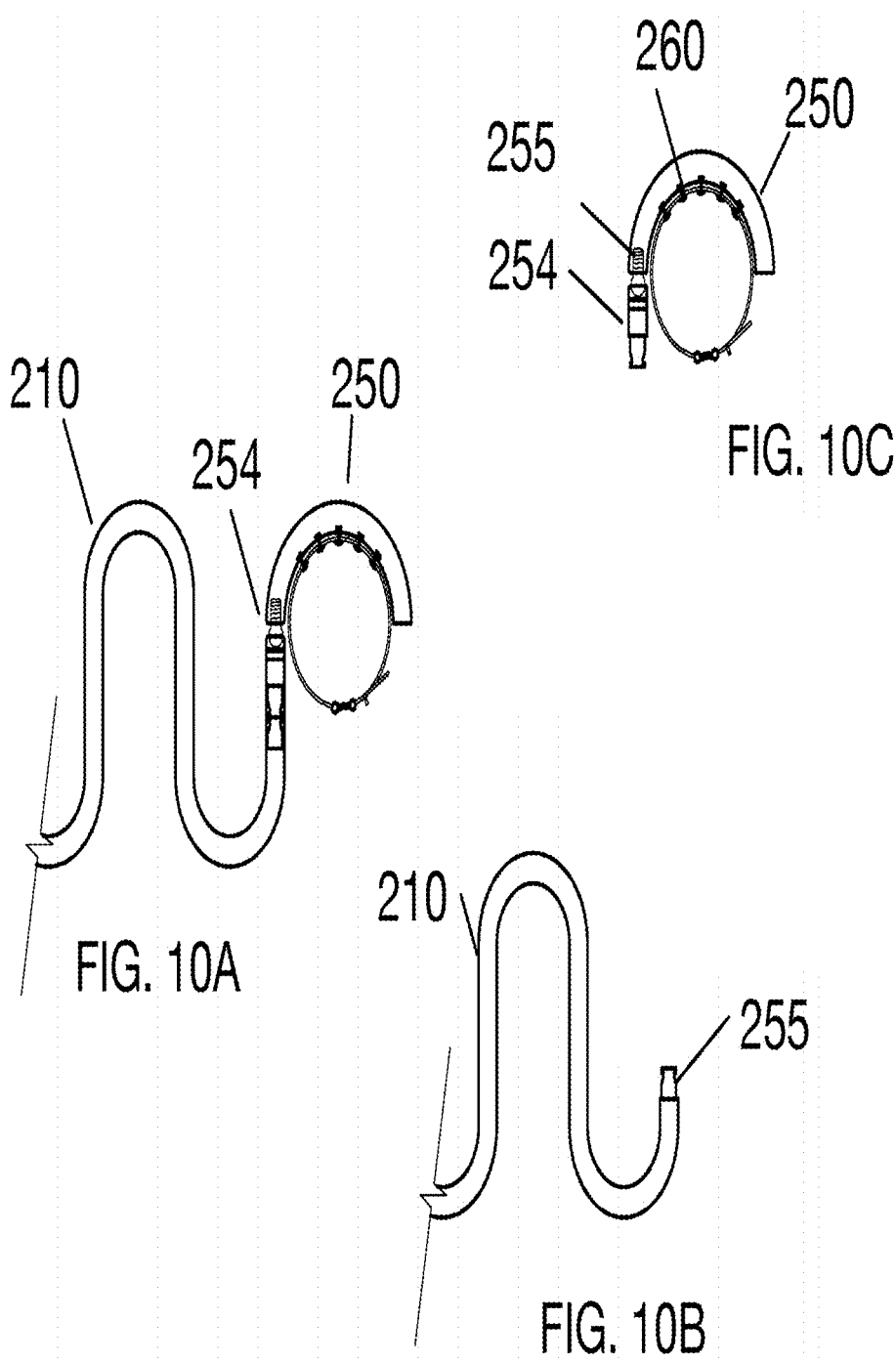
FIG. 10A is a rear view of a portion of the frame of the dog walking device of FIG. 3 with a breakaway coupler in proximity to the collar connector.
FIG. 10B is a rear view of a portion of the distal end portion of FIG. 10A detached from the frame.
FIG. 10C is a rear view of the breakaway coupler and collar connection of FIG. 10A detached from the frame.
Figure 10D:
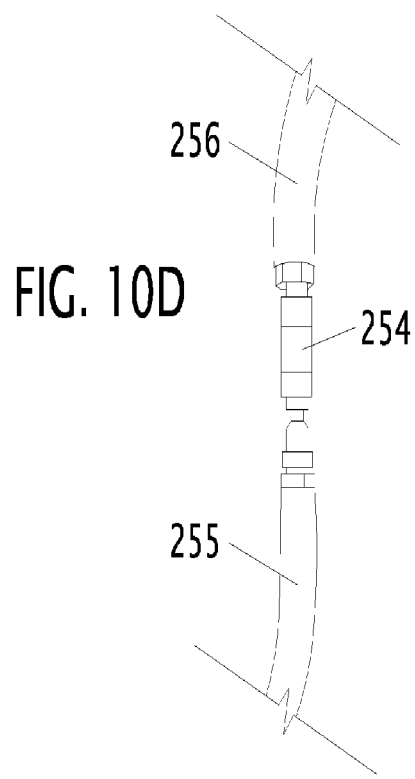
FIG. 10D is a detail of the breakaway coupler of FIG. 10A.
Figure 10E:
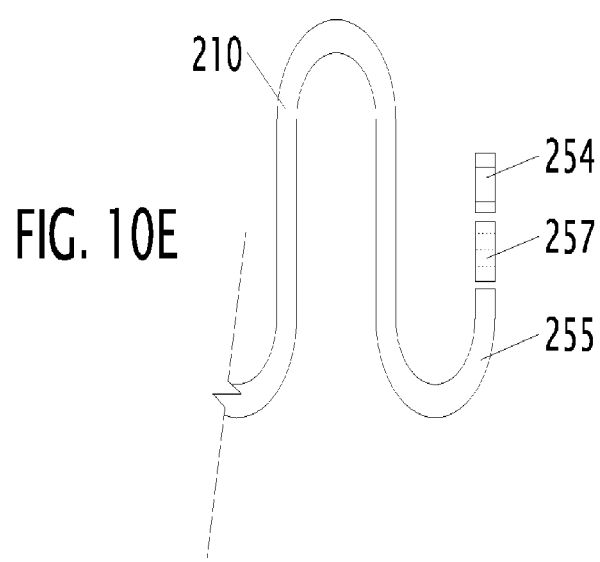
FIG. 10E is a detail exploded view of the breakaway coupler of FIG. 10A.

In some examples, the collar connection 260 may be detachable from the frame 210. FIG. 10A is a rear view of a portion of the frame 210 of the dog walking device of FIG. 3 with a breakaway coupler 254 in proximity to the collar connector. FIG. 10D is a detail of the break away coupler of FIG. 10A showing the breakaway coupler connecting frame section 255 to collar connection section 256. FIG. 10B is a rear view of the distal end portion 250 of FIG. 10A detached from the frame 210. FIG. 10C is a rear view of the breakaway coupler 254 and collar connection 260 of FIG. 10A detached from the frame 210. FIG. 10E is a detail exploded view of the breakaway coupler 254 attached to nipple 257 which is attached to frame section 255.

Figure 11:
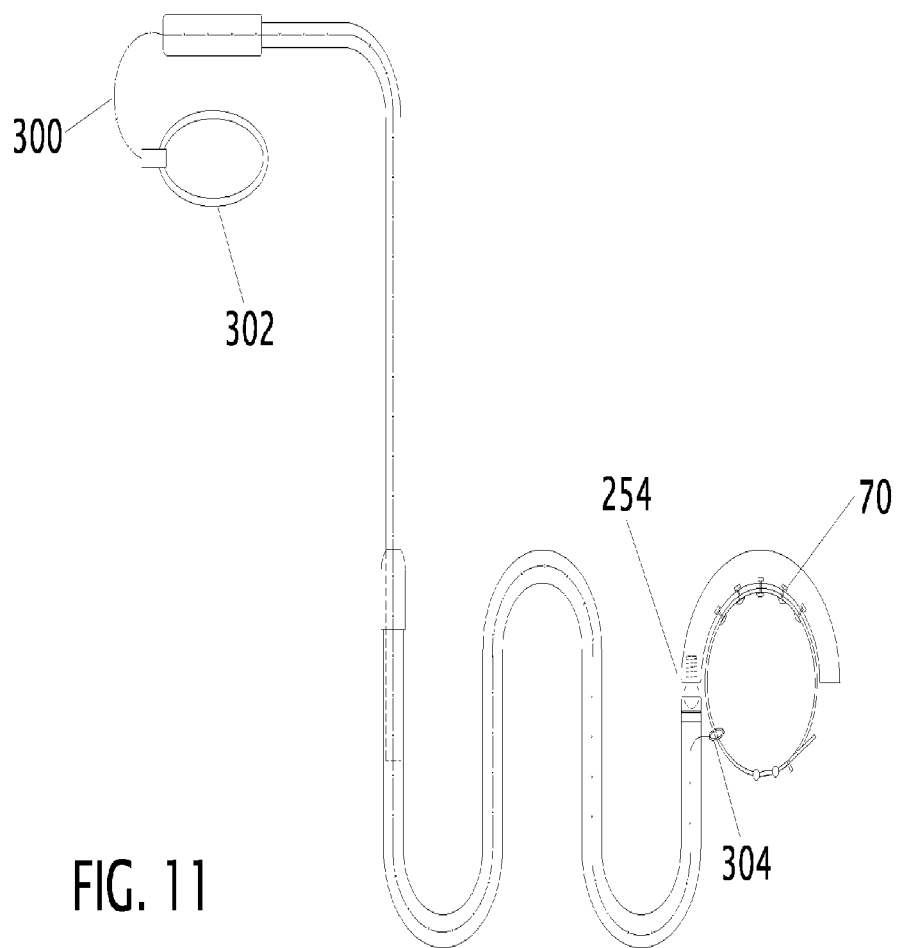
FIG. 11 is a front view of a safety cable routed through the frame of FIG. 10A.

FIG. 11 is a front view of a safety cable 300 routed through the frame of FIG. 10A and connected to collar 70 with connector 304. A wrist strap 302 is provided on the proximal end of the cable.

Example—Combination Vertical and Horizontal Handle

Figure 12:
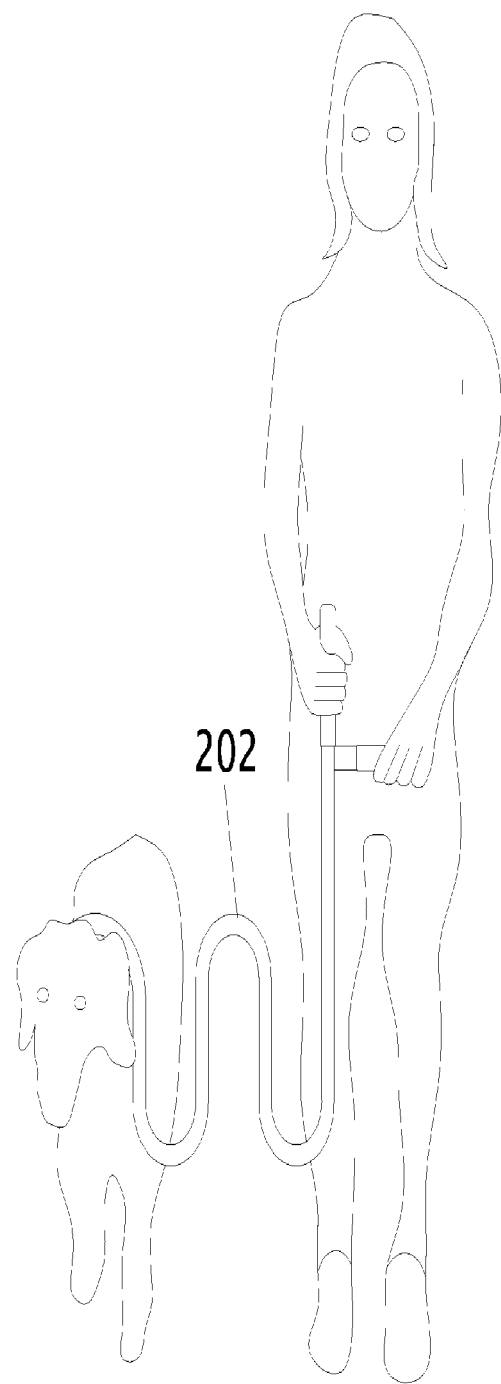
FIG. 12 is a front perspective view of a human walker or jogger and an example of a dog walking device with a combination handle.
Figure 13:
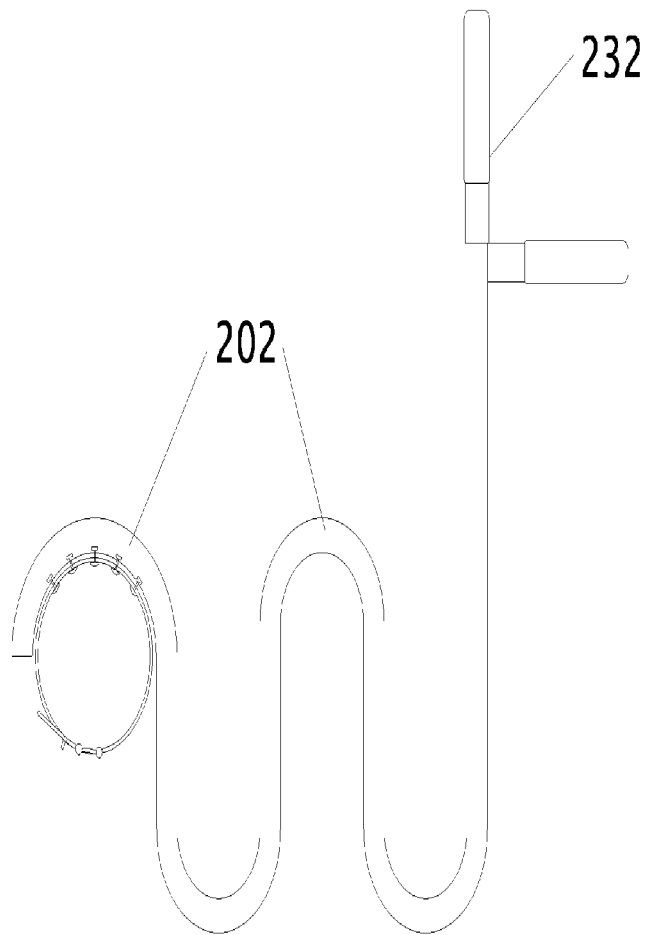
FIG. 13 is a front view of the dog walking device of FIG. 12.

FIG. 12 is a front perspective view of a human walker or jogger and an example of a dog walking device 202 with a combination handle 232. FIG. 13 is a front view of the dog walking de vice 202 of FIG. 12.

Example—Belt Assembly

Figure 14:
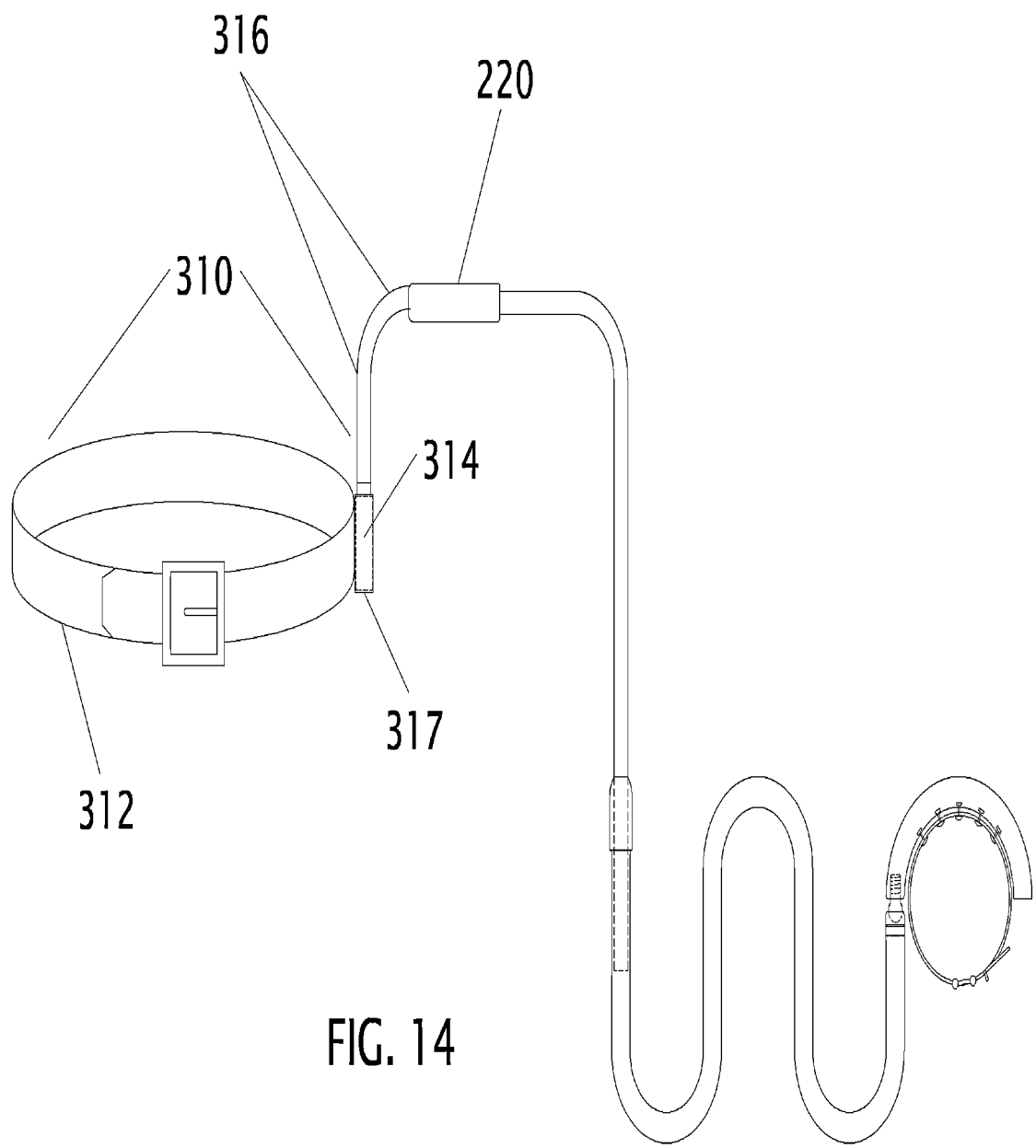
FIG. 14 is a rear view of the frame of FIG. 10A with a belt assembly.

FIG. 14 is a rear view of the frame of FIG. 10A with a belt assembly 310. In this example, the belt assembly has an extension 316 from the proximal end portion 220 of the frame. In this example, a rotating joint 314 and connector 317 attaches the belt 312 to the extension 316. The connector 317 may be a 1" diameter rigid tubing with bearing rollers. The belt can be adjusted with buckle 313.

Example—Horizontal U-Portions with Longitudinal Harness Connection

Figure 15A:
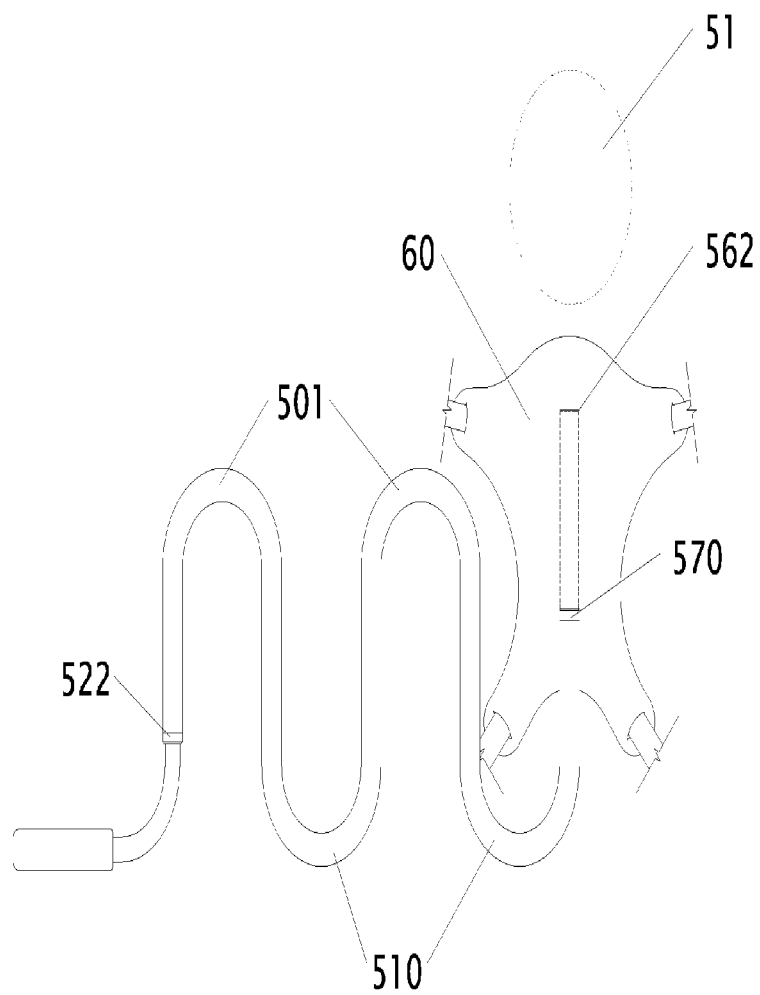
FIG. 15A is a top view of a dog walking showing a harness and a longitudinal harness connection.
Figure 15B:
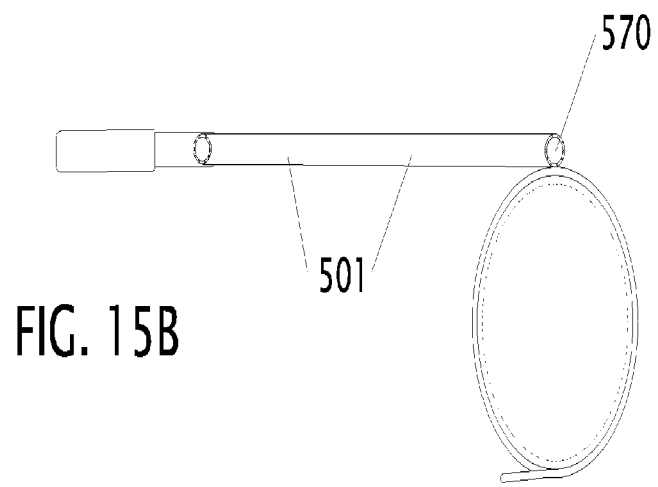
FIG. 15B is a side view of the dog walking device and harness connection of FIG. 15A
Figure 15C:
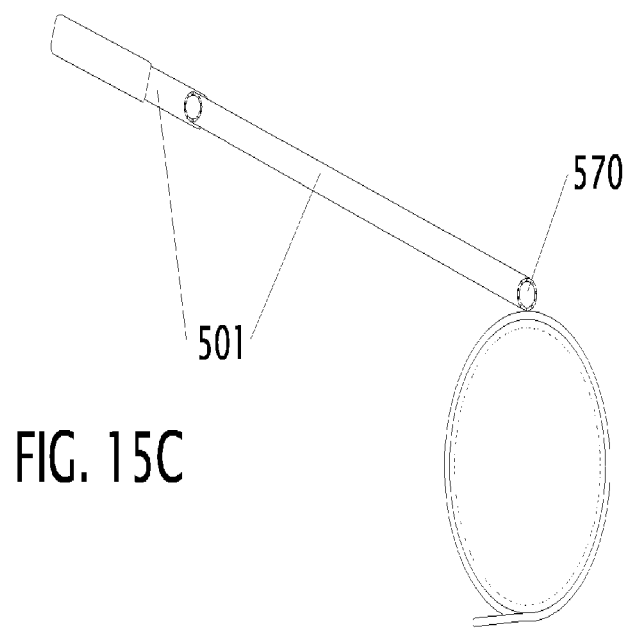
FIG. 15C is a side view of the dog walking device and harness connection of FIG. 15B partially rotated with respect to the harness.

In this example, the U-portions of the dog walking device frame are oriented horizontally or at an angle to the horizontal plane, rather than vertically as shown in the previous examples. In this example, a harness connection is provided on a dog walking device. FIG. 15A is a top view of the dog walking device 501 showing a harness 60. A section 562 of rigid tubing with bearing rollers is attached to the harness in parallel to the longitudinal axis of the dog. The harness connection includes a rotational joint 570. FIG. 15B is a side view of the dog walking device 501. FIG. 15C is a side view of the dog walking device 501 partially rotated with respect to the harness. The longitudinal harness connection provides additional guidance in aligning the dog's motion in a desired direction.

Example—Longitudinal Harness Spacer

Figure 16:
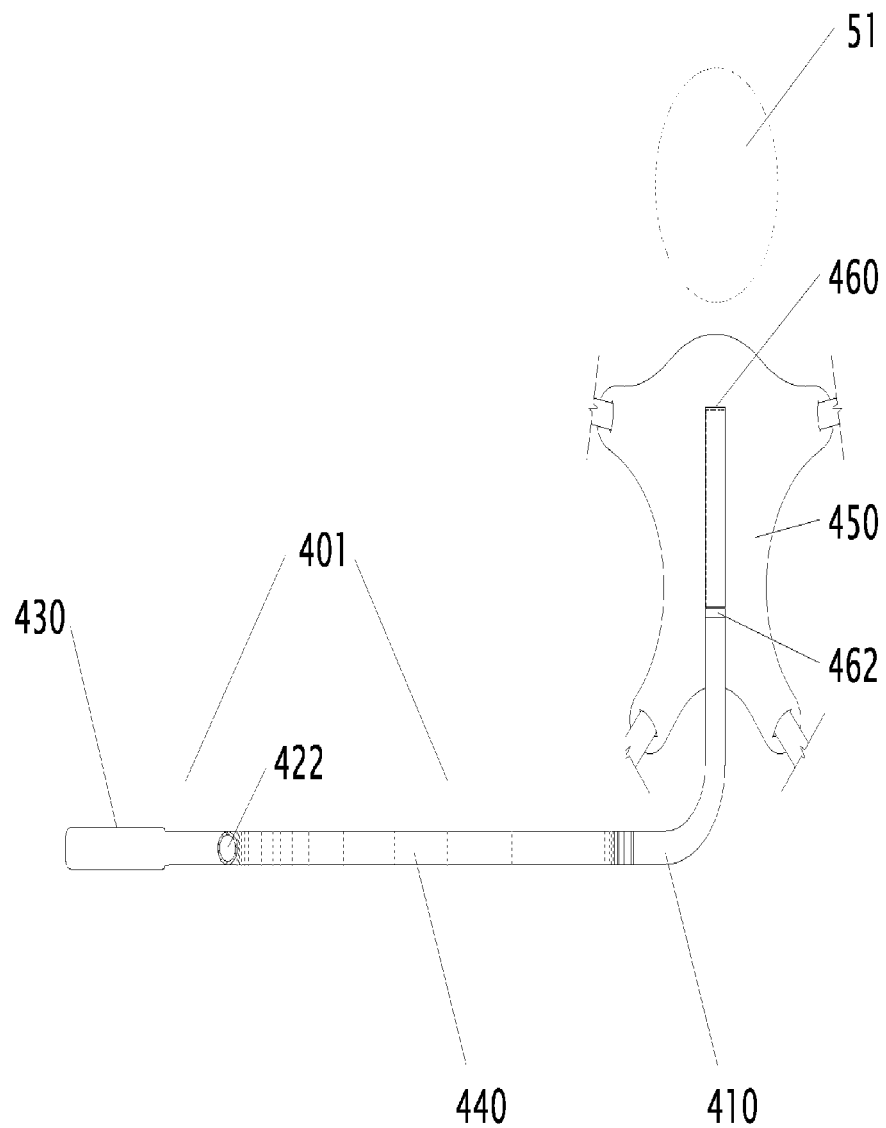
FIG. 16 is a top view of another example of a dog walking device.

FIG. 16 is a top view of another example of a dog walking device 401 where the intermediate frame section 440 comprises vertically-oriented U-shape and inverted U-shape elements. In this example, the intermediate frame 440 is formed of a rigid polymer or metal tubing. A first rotational joint 422 connects the proximal end portion 420 of the frame to the trapezoidal intermediate frame 440. A rotational joint 462 is provided on the longitudinal harness connector 460.

Example—Trapezoidal Harness Connector Assembly

Figure 17A:
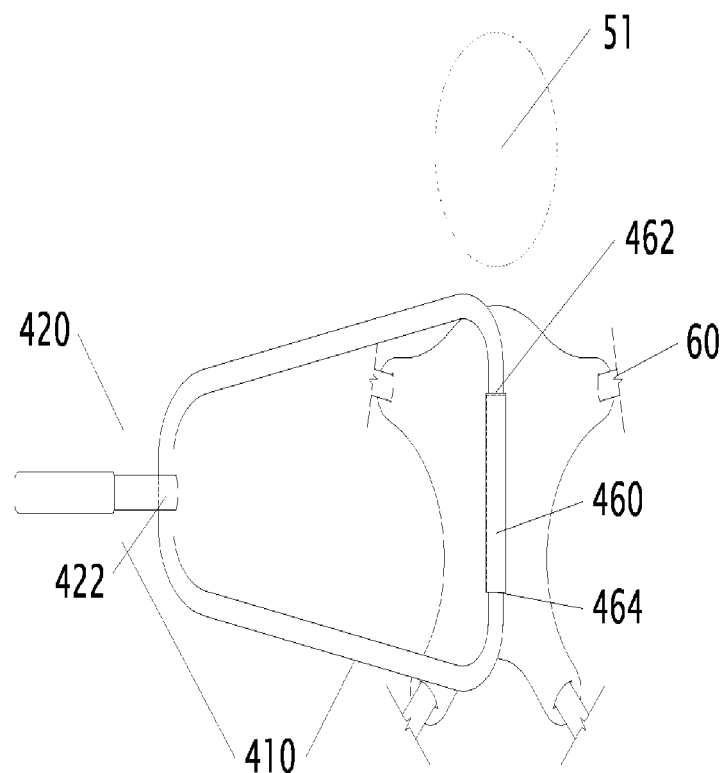
FIG. 17A is a top view of trapezoidal harness connector assembly.
Figure 17B:
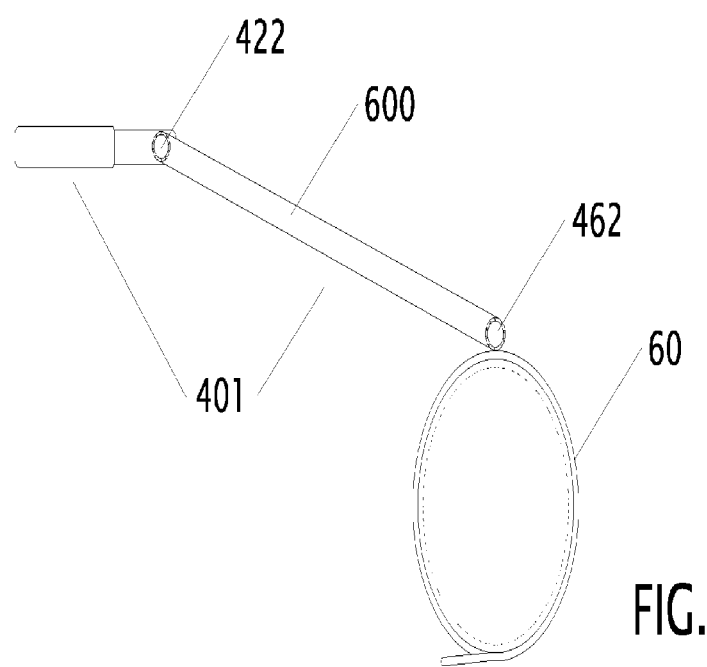
FIG. 17B is a side view of the trapezoidal harness connector assembly of FIG. 17A

FIG. 17A is a top view of trapezoidal harness connector assembly. FIG. 17A is a top view of trapezoidal harness connector assembly. FIG. 17B is a side view of the trapezoidal harness connector assembly of FIG. 17A In this example, the intermediate frame section is a trapezoidal frame 600 which is pivotally connected to the harness connector 460 and the proximal end portion 420.

It is to be understood that the specific embodiments and examples described above are by way of illustration, and not limitation. Various modifications may be made by one of ordinary skill.

What is claimed is:

1. A dog walking device comprising
    a frame configured to maintain a lateral distance between
       a dog and a human while the dog and the human are walking or jogging on a surface, the frame comprising
       a proximal frame portion;
       a distal frame portion;
       a rigid intermediate frame section between the proximal frame portion and the distal frame portion, the intermediate frame section providing a vertical offset and a horizontal offset between the proximal frame portion and the distal frame portion, the rigid intermediate frame section comprising
          a vertically-oriented proximal rigid U-shaped section, and
          a vertically-oriented first inverted rigid U-shaped section;
    a grip on the proximal frame portion, the grip configured to be grasped by at least one human hand; and
    a connection element on the distal frame portion, the connection element configured to be releasably attached to a dog harness or collar.

2. The dog walking device of claim 1 wherein the intermediate frame section further comprises
    a distal U-shaped section positioned between the first inverted U-shaped section and the connection element.

3. The dog walking device of claim 2 wherein the intermediate frame section further comprises
    a second inverted U-shaped section positioned between the distal U-shaped section and the first inverted U-shaped section.

4. The dog walking device of claim 2 wherein the intermediate frame section further comprises
    a safety cord or cable extending between the proximal frame portion and the connection element.

5. The dog walking device of claim 1 wherein the intermediate frame section further comprises
    a telescoping joint configured to adjust the vertical offset and a horizontal offset between
    the proximal end frame portion and the distal frame portion.

6. The dog walking device of claim 1 wherein the intermediate frame section further comprises
a breakaway joint.

7. The dog walking device of claim 1 wherein the vertical offset is within the range of 12 to 48 inches.

8. The dog walking device of claim 1 wherein the grip is configured to be grasped transverse to a human hand.

9. The dog walking device of claim 1 wherein the grip is configured to be grasped by a human hand in a handshake orientation.

10. The dog walking device of claim 1 wherein the grip is configured to be grasped by two human hands.

11. The dog walking device of claim 1 wherein the grip comprises a first vertically-oriented grip; and
a second horizontally-oriented grip.

12. The dog walking device of claim 1 further comprising at least one light.

13. The dog walking device of claim 12 further comprising a plurality of LED lights.

14. The dog walking device of claim 1 wherein the intermediate frame section comprises a plurality of hollow tubular frame sections which are configured to be disassembled for storage.

15. The dog walking device of claim 1 wherein the intermediate frame section comprises
a vertically oriented coiled spring.

16. A method for maintaining a lateral distance between a dog and a human while the dog and the human or walking or jogging on a surface, the method comprising
providing a dog walking device comprising
a frame configured to maintain a lateral distance between a dog and a human while the dog and the human are walking or jogging on a surface, the frame comprising
a proximal frame portion,
a distal frame portion,
a rigid intermediate frame section between the proximal frame portion and the distal frame portion, the intermediate frame section providing a vertical offset and a horizontal offset between the proximal frame portion and the distal frame portion, the rigid intermediate frame section comprising
a vertically-oriented proximal rigid U-shaped section, and
a vertically-oriented first inverted rigid U-shaped section,
a grip on the proximal frame portion, the grip configured to be grasped by at least one human hand, and
a connection element on the distal frame portion, the connection element configured to be releasably attached to a dog harness or collar;
attaching the distal frame portion of the dog walking device to a dog harness or collar;
and
gripping the grip while walking, jogging, or running.

* * * * *